(12) United States Patent
Kurokawa et al.

(10) Patent No.: US 6,379,548 B1
(45) Date of Patent: Apr. 30, 2002

(54) SYSTEM FOR RECOVERING AND TREATING WASTE WATER

(75) Inventors: Masahiro Kurokawa; Shiro Inoue; Shoichi Momose; Kazunori Koba, all of Osaka (JP)

(73) Assignee: Hitachi Zosen Corporation, Osaka (JP)

( * ) Notice: Subject to any disclaimer, the term of this patent is extended or adjusted under 35 U.S.C. 154(b) by 0 days.

(21) Appl. No.: 09/424,296

(22) PCT Filed: May 26, 1998

(86) PCT No.: PCT/JP98/02282
§ 371 Date: Nov. 22, 1999
§ 102(e) Date: Nov. 22, 1999

(87) PCT Pub. No.: WO98/54096
PCT Pub. Date: Dec. 3, 1998

(30) Foreign Application Priority Data

May 27, 1997 (JP) .............................. 9-136464

(51) Int. Cl.⁷ ................................................ C02F 9/00
(52) U.S. Cl. ...................... 210/631; 210/915; 210/207
(58) Field of Search ................. 210/615, 616, 210/743, 631, 207, 915

(56) References Cited

U.S. PATENT DOCUMENTS 6,238,564 B1 * 5/2001 Tanaka ...................... 210/608

FOREIGN PATENT DOCUMENTS

| JP | 60-139398 | 7/1985 |
| JP | 3-262585 | 11/1991 |
| JP | 4-305287 | 10/1992 |
| JP | 5-253576 | 10/1993 |
| JP | 6-312190 | 11/1994 |
| JP | 7-232192 | 9/1995 |
| JP | 8-224572 | 9/1996 |
| JP | 9-187785 | 7/1997 |

* cited by examiner

*Primary Examiner*—Chester T. Barry
(74) *Attorney, Agent, or Firm*—Armstrong, Westerman, Hattori, LLP (57) ABSTRACT

This invention provides a compact effluent water reclamation apparatus which is minimized in the kinds and amounts of chemicals to be used for the recovery of water to thereby reduce the amount of waste and eliminate equipment which necessitates a large area for installation. The effluent water reclamation apparatus comprises a reverse osmosis device and is adapted to treat acid-alkali effluent water containing organic matter but no fluorine, by concentrating the acid-alkali effluent water containing organic matter by reverse osmosis, evaporating the resulting concentrated water to dryness and collecting the water permeating through a reverse osmosis membrane. The apparatus is characterized in that the apparatus comprises as arranged upstream from the reverse osmosis device a neutralizing device for neutralizing the effluent water to prevent a scale component from separating out from the effluent water in the process of reverse osmosis, and a biological treatment tank for biologically treating the neutralized effluent water.

7 Claims, 4 Drawing Sheets

SYSTEM FOR RECOVERING AND TREATING WASTE WATER

TECHNICAL FIELD

The present invention relates to apparatus for reclaiming industrial effluent water, i.e., acid-alkali effluent water containing organic matter, and more particularly to apparatus for reclaiming effluent water containing ammonia and organic matter at relatively low concentrations, fluorine as the case may be, and further phosphoric acid, especially the effluent water to be discharged from the wet process practiced with use of ultrapure water in plants for manufacturing semiconductors, liquid crystals or like electronic products or devices.

BACKGROUND ART

Figure 3:
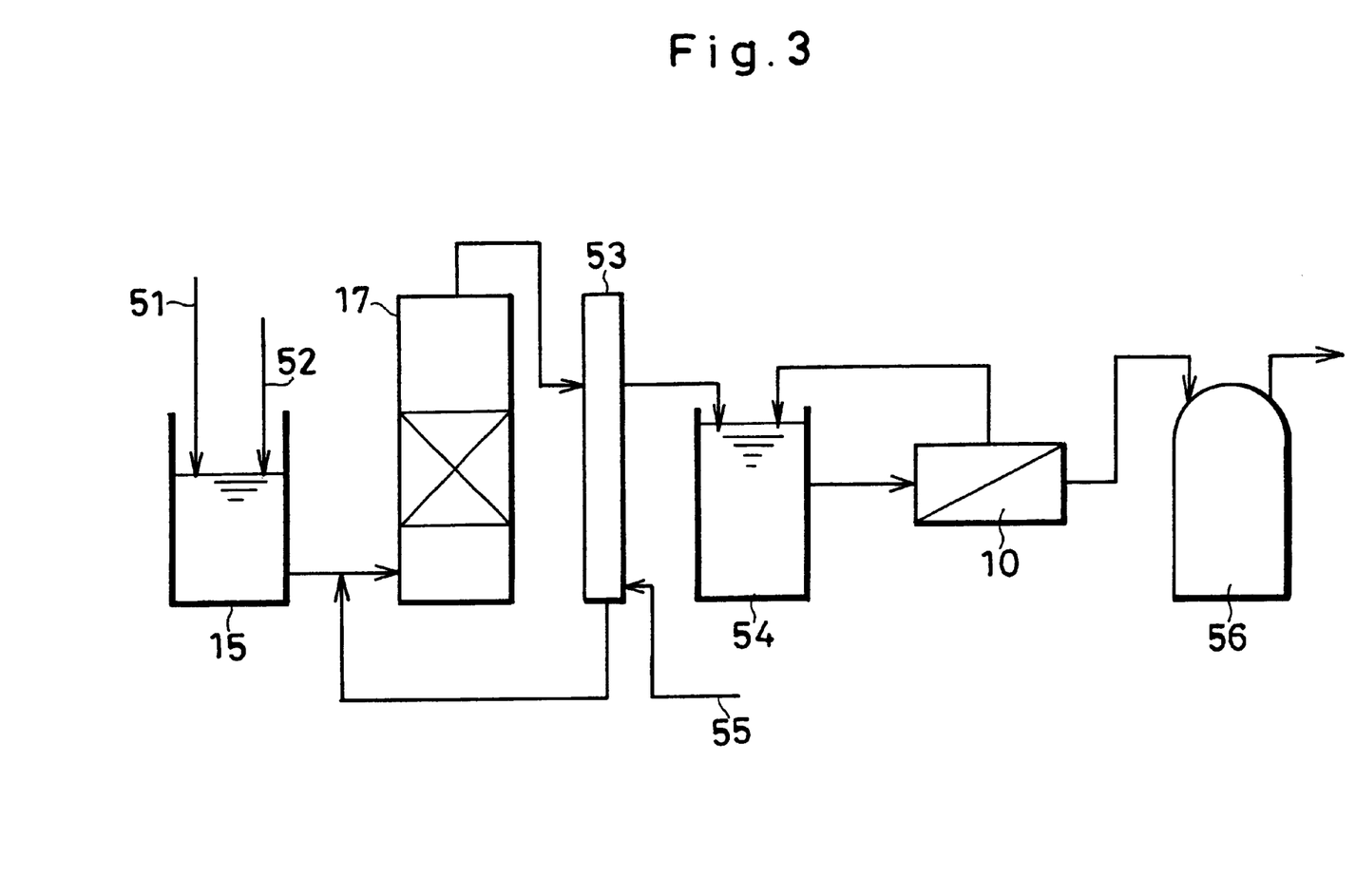
FIG. 3 is a flow chart showing a conventional procedure for treating effluent water containing organic matter.

When acid-alkali effluent water containing several ppm of organic matter is to be reclaimed, the effluent water is first neutralized in a neutralizing tank and thereafter treated in a biological treatment tank to decompose and remove the organic matter as shown in FIG. 3. The biologically treated water is subsequently supplied to an ultrafiltration (UF) circulation tank and then to a UF device to remove an SS component consisting mainly of microorganisms and contained in the treated water. The biologically treated water resulting from the removal of SS is fed to a regenerative ion exchange device for the removal of inorganic ions. The treated water free from inorganic ions is reused as recycled water from waste water or water for replenishing a cooling tower.

In the flow chart of FIG. 3, each reference numeral stands for as follows.

51; collected effluent
52; neutralizing agent
53; oxygen dissolving tank
54; UF circulation tank
55; air
56; regenerative ion exchange device The other reference numerals are the same as those of FIG. 1.

Figure 4:
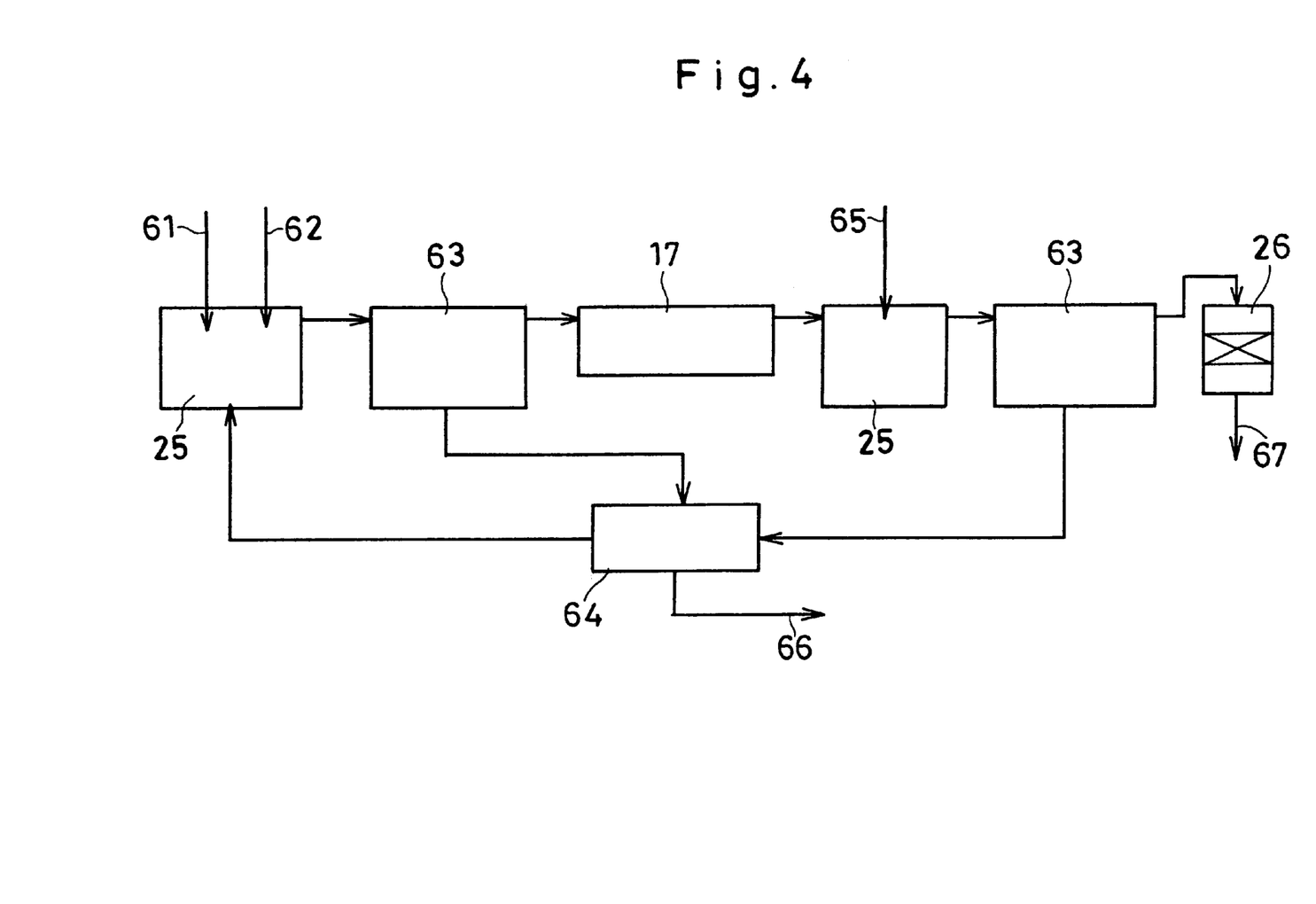
FIG. 4 is a flow chart showing a conventional procedure for treating effluent water containing flourine.

In the case of fluorine-containing effluent water, slaked lime is first added to the collected effluent water in a reactor for the primary treatment of the effluent water as shown in FIG. 4. $CaF_2$ is formed according to the reaction formula:

to precipitate in a settling tank, and sludge containing the precipitate is removed with a dehydrator. On the other hand, the water resulting from the primary treatment is treated in a biological treatment tank to decompose and remove organic matter. Aluminum sulfate serving as a coagulant is further added to the biologically treated water in a reactor for advanced treatment. $Al(OH)_3$ having a fluorine adsorbing property and formed according to the reaction formula:

is caused to adsorb the fluorine, followed by precipitation in a settling tank. The resulting sludge containing the $Al(OH)_3$ is removed with the dehydrator. The fluorine contained in a very small amount in the water subjected to the advanced treatment is removed by adsorption in a adsorption column packed with a chelate resin. The water treated is discharged from the column.

In the flow chart of FIG. 4, each reference numeral stands for as follows.

Figure 1:
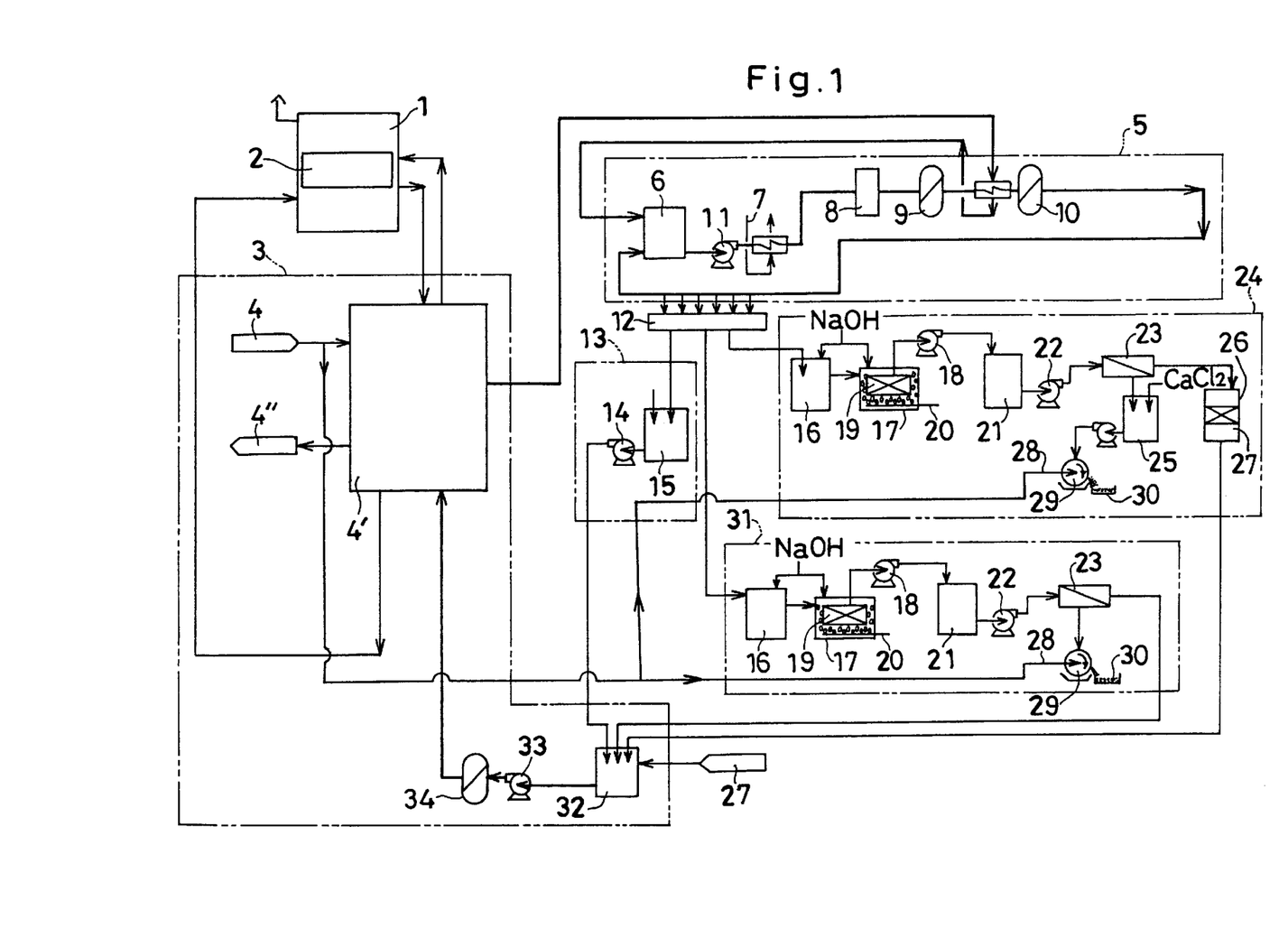
FIG. 1 is a flow chart showing a semiconductor wet process for use in Example 1.

61; flourine-containing collected effluent
62; slaked lime
63; settling tank
64; dehydrator
65; aluminum sulfate
66; sludge
67; discharge The other reference numerals are the same as those of FIG. 1.

The apparatus for reclaiming acid-alkali effluent water containing several ppm of organic matter includes a regenerative ion exchange device as described above. This device requires regeneration of the resin when ions are adsorbed to saturation. Usually 2 or 3 equivalent weights of a regenerant is used for removing one equivalent weight of ions and discharged from the device, while the regeneration discharges a large quantity of effluent. This gives rise to a need to suitably treat the effluent additionally.

The apparatus for reclaiming effluent water containing organic matter develops troubles such as clogging of the separation membrane device or ion exchange device disposed at a downstream location because the organic matter in the collected effluent permits active growth of microorganisms or because the metabolites of microorganisms, or fungi will leak.

On the other hand, slaked lime for use in treating fluorine-containing effluent water is in the form of fine particles and produces fine particles of $CaF_2$ through a liquid-phase reaction when dissolved in water. For a further advanced treatment of the effluent water, there is a need to add a coagulant to the water. The sludge produced by the use of these chemicals must be separated off by equipment such as a coagulation tank and thickener. The equipment then requires a large area for installation. To reduce the fluorine concentration of the treated water below the effluent regulation level, slaked lime serving as a neutralizing agent, aluminum sulfate as a coagulant, high-molecular-weight coagulant, etc. need to be used in excessive amounts, consequently producing a large quantity of sludge and adding to the amount of waste to be discarded. The sludge contains about 80% of water even when dewatered, and the $CaF_2$ content of the sludge is usually up to 10%.

The water recovered still remains to be treated for use as the raw water to be supplied to the pure water system resorting to conventional ion exchange and membrane separation.

An object of the present invention is to provide a compact effluent water reclamation apparatus which is minimized in the kinds and amounts of chemicals to be used for the recovery of water to thereby reduce the amount of waste and eliminate equipment, such as a thickener, which necessitates a large area for installation.

Another object of the invention is to provide an effluent water reclamation apparatus which is adapted for continuous treatment free of the likelihood of a membrane separation device or ion exchange device becoming clogged with microorganisms.

DISCLOSURE OF THE INVENTION

The present invention provides a first effluent water reclamation apparatus comprising a reverse osmosis device and adapted to treat acid-alkali effluent water containing organic matter but no fluorine. The first apparatus concentrates acid-alkali effluent water containing organic matter by reverse osmosis, evaporates the resulting concentrated water to dryness and collects the water permeating through a reverse osmosis membrane. The apparatus is characterized in that the apparatus comprises as arranged upstream from the reverse osmosis device a neutralizing device for neutralizing the effluent water to prevent a scale component from separating out from the effluent water in the process of reverse osmosis, and a biological treatment tank for biologically treating the neutralized effluent water.

With the first effluent water reclamation apparatus, fluorine-free effluent water is neutralized, for example, with an aqueous solution of caustic soda at a position upstream from the reverse osmosis device so as to render the effluent water unlikely to permit a scale component to separate out (to give high solubility) even if the water is concentrated to an extreme extent with the reverse osmosis device. The neutralized effluent water is treated in the biological treatment device to decompose and remove the organic matter. The biological treatment tank has an activated carbon packed layer which is fully supplied with oxygen or which is fluidized while being supplied with oxygen. Ammonia is digested in the biological treatment tank when contained in the effluent water. The pH of the effluent water drops during the process of digestion, so that the water is neutralized with an aqueous solution of caustic soda. The treated water flowing out from the biological treatment tank contains an SS component consisting predominantly of bacterial cells, so that the SS component is removed with an ultrafiltration (UF) device. The ultrafiltration (UF) membrane to be used is one having special spacers adapted to prevent adhesion of or clogging with bacterial cells, such as Preprox UF membrane, product of Kurita Water Industries, Ltd. Alternatively available is a method of conducting the biological treatment and removing the SS component in a single tank, by immersing a microfiltration (MF) membrane in a biological treatment tank wherein an activated carbon layer is fluidized with a supply of oxygen and sucking the effluent water through the MF membrane to obtain permeating water. The biologically treated water resulting from the removal of the SS component has high solubility and can therefore be concentrated with a reverse osmosis (RO) device to an extreme extent, for example, to 1/40 of the amount of treatment (permeating water 97.5, concentrated water 2.5 when the amount of treatment is taken as 100). The reverse osmosis (RO) membrane is, for example, SE-10, product of Nitto Denko Corp. The water concentrated to an extreme extent is fed to an evaporator-dryer, whereby the sludge component is evaporated to dryness. The evaporator-dryer is, for example, a drum dryer. The water permeating through the reverse osmosis membrane is collected for reuse as recycled water from waste water, water for replenishing a cooling tower or raw water for the distillation pure water system.

The present invention provides a second effluent water reclamation apparatus comprising a reverse osmosis device and adapted to treat acid-alkali effluent water containing fluorine in addition to organic matter. The second apparatus concentrates acid-alkali effluent water containing organic matter and fluorine by reverse osmosis, evaporates the resulting concentrated water to dryness and collects the water permeating through a reverse osmosis membrane. The apparatus is characterized in that the apparatus comprises a neutralizing device disposed upstream from the reverse osmosis device for neutralizing the effluent water to prevent a scale component from separating out from the effluent water in the process of reverse osmosis, a biological treatment tank for biologically treating the neutralized effluent water, a calcium chloride adding device for adding calcium chloride to the concentrated water resulting from the reverse osmosis, and an adsorption column for removing fluorine ions from the water permeating through the reverse osmosis membrane.

The effluent water to be treated with the second apparatus can further contain phosphoric acid.

The fluorine-containing effluent water is treated by the second apparatus in the same manner as the fluorine-free effluent water until it is treated with the reverse osmosis device for concentration. A reactor is disposed upstream from an evaporator-dryer for adding $CaCl_2$ to the concentrated water therein. Thus added to the water concentrated in the reverse osmosis device to an extreme extent is an aqueous solution of calcium chloride in an amount approximately equivalent to the fluorine concentration. The fluorine contained in the concentrated water is converted into $CaF_2$ of low solubility in the reactor, and the $CaF_2$ produced is supplied to the evaporator and subjected to evaporation to dryness along with other sludge component. The conversion of the fluorine in the form of NaF as contained in the concentrated effluent water into $CaF_2$ assures a facilitated drying procedure and ease of handling of the dried sludge. On the other hand, disposed downstream from the reverse osmosis device is an adsorption column packed with an adsorber for removing fluorine from the water permeating through the reverse osmosis membrane. The adsorber is, for example, a chelate resin or zirconium adsorber. The permeating water having the fluorine adsorbed by the chelate resin for removal is collected and reused as recycled water from waste water, water for replenishing the cooling tower or raw water for the distillation pure water system.

The biological treatment tanks for use in the first and second effluent water reclamation apparatus are preferably those for practicing the fluidized-bed biological activated carbon process. A microfiltration (MF) membrane can be provided in the treatment tank for separating the SS component from the treated water before feeding to the reverse osmosis device.

The present invention provides a third effluent water reclamation apparatus comprising an evaporator and adapted to treat acid-alkali effluent water containing organic matter but no fluorine. The third apparatus concentrates acid-alkali effluent water containing organic matter by evaporation, evaporates the resulting concentrated water to dryness and collects the vapor in the form of water. The apparatus is characterized in that the apparatus comprises as arranged upstream from the evaporator a neutralizing device for neutralizing the effluent water to prevent a scale component from separating out from the effluent water in the process of concentration by evaporation, and a biological treatment tank for biologically treating the neutralized effluent water.

The third apparatus and the treatment procedure thereof are basically the same as those of the first apparatus except that the reverse osmosis device of the first apparatus is replaced by the evaporator. With the third apparatus, the device positioned downstream from the biological treatment tank and upstream from the evaporator is mainly operated with heating and is free of troubles due to the presence of microorganisms. Accordingly an SS separator is disposed downstream from the biological treatment device for separating the SS component from the treated water. The SS separator is preferably a centrifugal strainer, which is, for example, one manufactured by IM Corporation. Examples of useful evaporators are a multi-effect evaporator and a thermo-compression evaporator.

The present invention provides a fourth effluent water reclamation apparatus comprising an evaporator and adapted to treat acid-alkali effluent water containing fluorine in addition to organic matter. The fourth apparatus concentrates acid-alkali effluent water containing organic matter and fluorine by evaporation, evaporates the resulting concentrated water to dryness and collects the vapor in the form of water. The apparatus is characterized in that the apparatus comprises a neutralizing device disposed upstream from the evaporator for neutralizing the effluent water to prevent a scale component from separating out from the effluent water in the process of concentration by evaporation, a biological treatment tank for biologically treating the neutralized effluent water, and a calcium chloride adding device for adding calcium chloride to the concentrated water resulting from the process of concentration by evaporation.

The fourth apparatus and the treatment procedure thereof are basically the same as those of the second apparatus except that the reverse osmosis device of the second apparatus is replaced by the evaporator. With the fourth apparatus as in the third apparatus, the device positioned downstream from the biological treatment tank and upstream from the evaporator can be a centrifugal strainer for removing the SS component, and the evaporator to be used is, for example, a multi-effect evaporator or thermo-compression evaporator.

The biological treatment tanks for use in the third and fourth effluent water reclamation apparatus are preferably those for practicing the fluidized-bed biological activated carbon process. A microfiltration (MF) membrane can be provided in the treatment tank for separating the SS component from the treated water before feeding to a reverse osmosis device. When required, an adsorption column is provided in the fourth apparatus for removing fluorine ions from the water permeating through the reverse osmosis membrane.

The water obtained by the treatment in the first, second, third or fourth apparatus can be collected and mixed with replenishing industrial water or city water for use as raw water for the distillation pure water system.

BEST MODE FOR CARRYING OUT THE INVENTION

Examples of the present invention will be described below in detail with reference to effluent water reclamation systems for wet processes for manufacturing semiconductors with use of large amounts of chemicals and pure water. However, the invention is not limited to these examples.

The effluent water discharged from the wet process is collected as separated into dilute effluent water, acid-alkali concentrated effluent water and effluent water containing hydrofluoric acid and phosphoric acid. Table 1 shows the properties of these effluents.

TABLE 1

Properties of Rinsed Effluents from Semiconductor Wet Processes

| Effluent water | Dilute water | Acid-alkali concentrated water | Hydrofluoric, phosphoric acid-containing water |
|---|---|---|---|
| Water amt. | 60 | 20 | 20 |
| Conductivity ($\mu$S/cm) | 60 | 2200 | 800 |
| TOC (ppm) | 525 | 2200 | 2200 |
| pH | 2.8 | 2.3 | 2.7 |
| Main component | $H_2SO_4$ $H_2O_2$ $NH_4OH$ $HCl$ | $H_2SO_4$ $H_2O_2$ $NH_4OH$ $HCl$ | $HF$ $NH_4F$ $H_3PO_4$ |

Water amt., i.e., the amount of each effluent, is a value estimated when the amount of ultrapure water used is taken as 100.

EXAMPLE 1

With reference to FIG. 1, the raw water to be supplied to a distillation pure water system can be of rough properties unlike the material for the pure water system consisting essentially of an ion exchange device and membrane filtration device, so that the dilute effluent is merely adjusted in pH in a neutralizing tank and then collected in a raw water tank. The neutralizing agent to be used is an aqueous solution of caustic soda, which renders the effluent highly soluble and less likely to permit a scale component to separate out in the concentration process of the distillation pure water system.

The acid-alkali concentrated effluent is first neutralized in a neutralizing tank so as not to interfere with the activity of microorganisms in a biological treatment tank. The neutralizing agent to be used is an aqueous solution of caustic soda for rendering the effluent highly soluble and less likely to permit a scale component to separate out in the concentration process of a reverse osmosis device. The effluent is about 620 $\mu$S/cm in conductivity after neutralization.

The neutralized acid-alkali concentrated effluent is fed to a biological treatment tank for decomposing organic matter (TOC) and digesting ammonia. The treating tank is provided at its bottom with aeration nozzles for uniformly aerating the entire tank. The tank contains activated carbon which serves as a carrier for retaining microorganisms thereon and which is fluidized within the tank by the aeration. The tank further has an MF membrane immersed therein for separating an SS component from the biologically treated water to supply the resulting water to a reverse osmosis device. The MF membrane is a flat membrane so shaped as to hold spacers between membrane portions, such that the water to be treated is positioned outside the membrane, and the water permeating through the membrane flows through the spacers and is transported to a treated water tank by a suction pump. Since the digestion of ammonia in the biological treating tank results in a lower pH, an aqueous solution of caustic soda is placed into the treating tank to adjust the pH to 7. After the removal of the SS component, the biologically treated water is about 660 $\mu$S/cm in conductivity and about 660 ppb in TOC.

The biologically treated water resulting from the removal of the SS component is fed from the treated water tank to the reverse osmosis device, in which about 99% of inorganic ions are removed. The water permeating through the reverse osmosis membrane is 97.5% in recovery ratio, about 160 µS/cm in conductivity and about 550 ppb in TOC. The permeating water is collected in the raw water tank.

The water concentrated to 2.5% of the amount of water treated is about 22000 µS/cm in conductivity and about 4850 ppb in TOC, and is fed to a drum dryer and evaporated to dryness. The solidified dry sludge is disposed of as waste.

The effluent containing hydrofluoric acid and phosphoric acid is treated in the same manner as the acid-alkali concentrated effluent until it is treated by reverse osmosis. The water resulting from the treating steps has the following properties. The neutralized effluent is about 110 µS/cm in conductivity, the biologically treated water as separated from the SS component is about 150 µS/cm in conductivity and about 660 ppb in TOC, the water permeating through the reverse osmosis membrane is about 50 µS/cm in conductivity and about 550 ppb in TOC, and the water concentrated by reverse osmosis (RO) is about 5000 µS/cm in conductivity and about 4850 ppb in TOC. Since the water permeating through the reverse osmosis membrane contains about 1 ppm of fluorine ions and about 10 ppm of phosphate ions, these ions are removed by adsorption in a chelate resin adsorption column disposed downstream from the reverse osmosis device to reduce both the ion contents to about 0.1 ppm. The water is then collected in the raw water tank. Disposed upstream from an evaporator-dryer is a reactor wherein an aqueous solution of $CaCl_2$ is added to the water concentrated by reverse osmosis to convert the fluorine therein in the form of NaF into $CaF_2$ to facilitate handling of the concentrate by the dryer and make the dried sludge easy to handle. The fluorine contained in the concentrated water is converted into $CaF_2$ of low solubility in the reactor, and the fluoride is supplied to the drum dryer and subjected to evaporation to dryness along with other sludge component. The solidified dry sludge is disposed of as waste.

The water resulting from the effluent treatments is collected in the raw water tank and mixed with replenishing industrial water, and the mixture is fed to a fluidized-bed biological activated carbon device, in which the mixture is treated by decomposition to TOC of about 160 ppb. The water treated by this device is about 150 µS/cm in conductivity and about 160 ppb in TOC, and the water of this quality is satisfactory for use as a feed to the distillation pure water system. The water treated with the biological activated carbon device is supplied to the distillation pure water system and thereby made into primary pure water which is 15 MΩ·cm in resistivity and 10 ppb in TOC. The primary water is fed to a subsystem and made into ultrapure water which is 18.2 MΩ·cm in resistivity and up to 1 ppb in TOC for use in the wet process for manufacturing semiconductors.

In the flow chart of FIG. 1, which shows procedure of Example 1, each reference numeral stands for as follows.

1; cooling tower for entire plant
2; cooling tower for pure water system
3; primary pure water system
4; hot steam
4'; distillation pure water system
4"; steam drain
5; subsystem
6; pure water tank
7; cooling water
8; low-pressure UV
9; polisher
10; UF membrane
11; ultrapure water circulation pump
12; use points
13; dilute effluent system
14; water feed pump
15; neutralizing tank
16; neutralizing tank
17; biological treatment tank
18; suction pump
19; MF membrane
20; aeration
21; treated water tank
22; RO pump
23; RO membrane
24; hydrofluoric acid-phosphoric acid recovery system
25; reactor
26; adsorption column
27; industrial water
28; steam
29; drum dryer
30; evaporation to dryness
31; acid-alkali effluent recovery system (concentrated waste liquid)
32; raw water tank
33; raw water pump
34; activated carbon device

EXAMPLE 2

Figure 2:
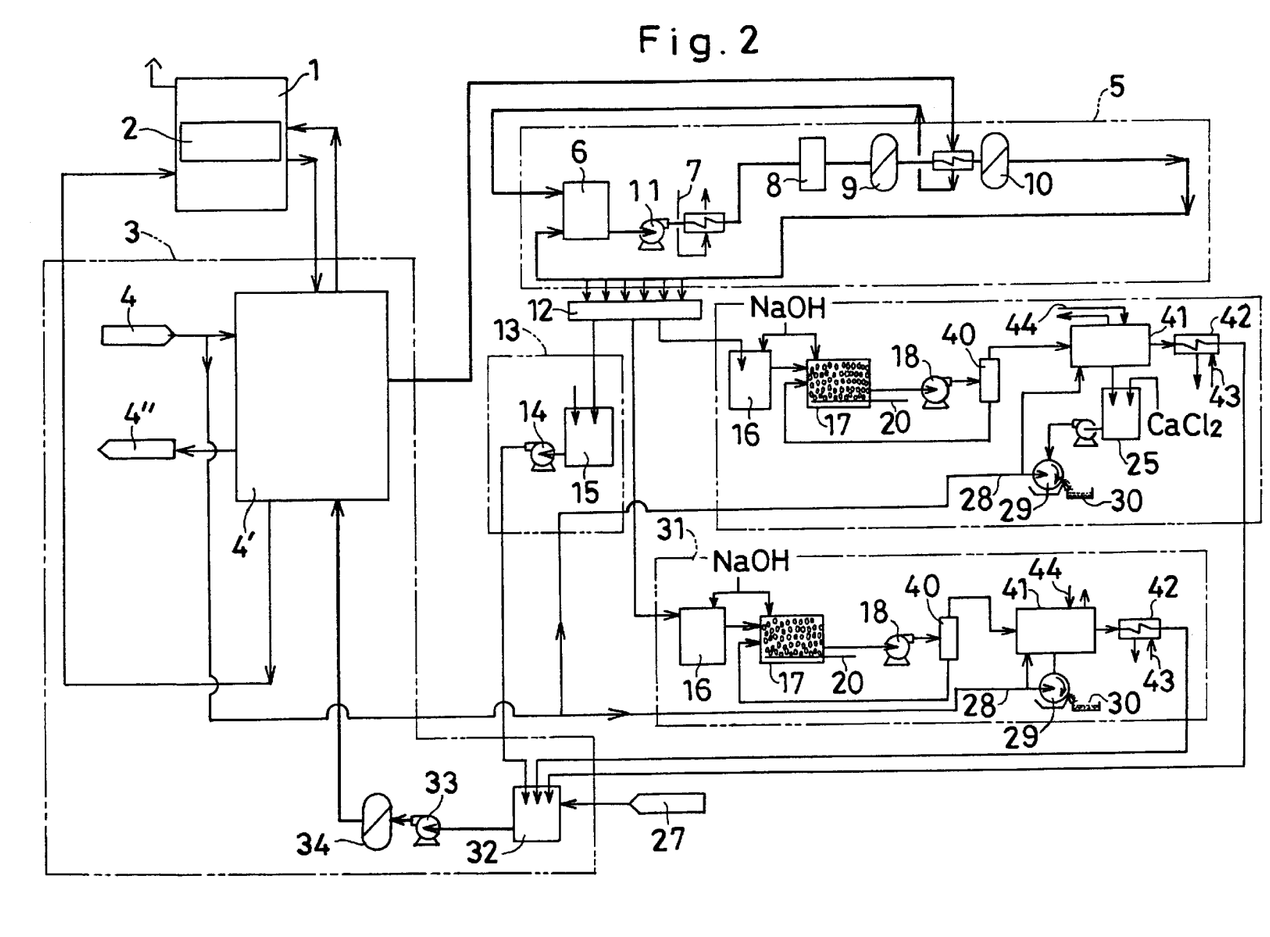
FIG. 2 is a flow chart showing a semiconductor wet process for use in Example 2.

With reference to FIG. 2, the raw water to be supplied to a distillation pure water system can be of rough properties unlike the material for the pure water system consisting essentially of an ion exchange device and membrane filtration device, so that the dilute effluent is merely adjusted in pH in a neutralizing tank and then collected in a raw water tank. The neutralizing agent to be used is an aqueous solution of caustic soda, which renders the effluent highly soluble and less likely to permit a scale component to separate out in the concentration process of the distillation pure water system.

The acid-alkali concentrated effluent is first neutralized in a neutralizing tank so as not to interfere with the activity of microorganisms in a biological treatment tank. The neutralizing agent to be used is an aqueous solution of caustic soda for rendering the effluent highly soluble and less likely to permit a scale component to separate out in the concentration process of an evaporator. The effluent is about 620 µS/cm in conductivity after neutralization.

The neutralized acid-alkali concentrated effluent is fed to a biological treatment tank for decomposing organic matter (TOC) and digesting ammonia. The treating tank is provided at its bottom with aeration nozzles for uniformly aerating the entire tank. The tank contains activated carbon which serves as a carrier for retaining microorganisms thereon and which is fluidized within the tank by the aeration.

Since the digestion of ammonia in the biological treating tank results in a lower pH, an aqueous solution of caustic soda is placed into the treating tank to adjust the pH to 7. After the removal of the SS component, the biologically treated water is about 660 µS/cm in conductivity and about 660 ppb in TOC.

Since the biologically treated water contains an SS component consisting predominantly of bacterial cells, the SS component is removed with a centrifugal strainer. The devices arranged downstream from the treating tank are mainly operated with heating, no trouble attributable to microorganisms will occur even if the centrifugal strainer is used for removing the SS component.

The biologically treated water resulting from the removal of the SS component is fed from the treated water tank to the evaporator, in which almost all impurities (ion component) are concentrated. The recovery ratio achieved is 97.5%. The distilled water flowing out from the evaporator is about 1.5 $\mu$S/cm in conductivity and about 66 ppb in TOC. The distilled water is cooled in a heat exchanger to about 35° C. and collected in the raw water tank.

The water concentrated to 2.5% of the amount of water treated is about 25000 $\mu$S/cm in conductivity and about 5000 ppb in TOC, and is fed to a drum dryer and evaporated to dryness. The solidified dry sludge is disposed of as waste.

The effluent containing hydrofluoric acid and phosphoric acid is treated in the same manner as the acid-alkali concentrated effluent until it is treated by evaporation for concentration. The water resulting from the treating steps has the following properties. The neutralized effluent is about 110 $\mu$S/cm in conductivity, the biologically treated water as separated from the SS component is about 150 $\mu$S/cm in conductivity and about 660 ppb in TOC, the distilled water flowing out from the evaporator is about 0.5 $\mu$S/cm in conductivity and about 66 ppb in TOC, and the concentrated water egressing from the evaporator is about 5000 $\mu$S/cm in conductivity and about 5000 ppb in TOC. The distilled water from the evaporator contains about 0.03 ppm of fluorine and is therefore cooled as it is in a heat exchanger to about 35° C. and collected in the raw water tank. Disposed upstream from an evaporator-dryer is a reactor wherein an aqueous solution of $CaCl_2$ is added to the concentrated water from the evaporator to convert the fluorine therein in the form of NaF into $CaF_2$ to facilitate handling of the concentrate by the dryer and make the dried sludge easy to handle. The fluorine contained in the concentrated water from the evaporator is converted into $CaF_2$ of low solubility in the reactor, and the fluoride is supplied to the drum dryer and subjected to evaporation to dryness along with other sludge component. The solidified dry sludge is disposed of as waste.

The water resulting from the effluent treatments is collected in the raw water tank and mixed with replenishing industrial water, and the mixture is fed to a fluidized-bed biological activated carbon device, in which the mixture is treated by decomposition to TOC of about 160 ppm. The water treated by this device is about 150 $\mu$S/cm in conductivity and about 160 ppb in TOC, and the water of this quality is satisfactory for use as a feed to the distillation pure water system. The water treated by the biological activated carbon device is supplied to the distillation pure water system and thereby made into primary pure water which is 15 M$\Omega$·cm in resistivity and 10 ppb in TOC. The primary water is fed to a subsystem and made into ultrapure water which is 18.2 M$\Omega$·cm in resistivity and up to 1 ppb in TOC for use in the wet process for manufacturing semiconductors.

The chemicals to be used for the effluent water reclamation treatment of the present invention are limited only to an aqueous solution of caustic soda for neutralization, and aqueous solution of calcium chloride, which is used when the effluent contains hydrochloric acid, and are fewer than in the prior art. The chemicals to be added are each in the form of an aqueous solution, easer to handle and reactive at a higher velocity, hence no need to use an excess of the chemical. This renders the chemical usable at a reduced cost, and diminishes the amount of dry sludge to be discharged.

Since there is no need to use equipment, such as a thickener, which requires a large area for installation, the apparatus is compact in its entirety.

In the case of the third and fourth effluent reclamation apparatus, the devices arranged downstream from the biological treatment device are operated mainly with heating, can therefore be free of troubles due to microorganisms, rendering the apparatus operable continuously.

Effluent water can be reclaimed for reuse as pure water by using the effluent water reclamation apparatus of the invention in combination with a distillation pure water system.

In the flow chart of FIG. 2, which shows procedure of Example 2, each reference numeral stands for as follows.

40; centrifugal strainer
41; evaporator
42; heat exchanger
43, 44; cooling water The other reference numerals are the same as those of FIG.1.

INDUSTRIAL APPLICABILITY

The present invention relates to apparatus for reclaiming industrial effluent water, i.e., acid-alkali effluent water containing organic matter, and more particularly to apparatus for reclaiming effluent water containing ammonia and organic matter at relatively low concentrations, fluorine as the case may be, and further phosphoric acid. The invention relates especially to apparatus for reclaiming the effluent water to be discharged from the wet process practiced with use of ultrapure water in plants for manufacturing semiconductors, liquid crystals or like electronic products or devices.

What is claimed is:

1. In a system for concentrating acid-alkali effluent water containing organic matter by reverse osmosis, evaporating the resulting concentrated water to dryness and collecting the water permeating through a reverse osmosis membrane, an effluent water reclamation apparatus comprises as arranged upstream from a reverse osmosis device a neutralizing device for neutralizing the effluent water to prevent a scale component from separating out from the effluent water in the process of reverse osmosis, and a biological treatment tank for biologically treating the neutralized effluent water, the biological treatment tank using a fluidized-bed biological activated carbon process, wherein the biological treatment tank is provided in its interior with a microfiltration membrane for separating an SS component from the treated water, said microfiltration membrane being a flat membrane shaped to hold spacers between membrane portions so that the water to be treated is positioned outside the membrane.

2. In a system for concentrating acid-alkali effluent water containing organic matter and fluorine by reverse osmosis, evaporating the resulting concentrated water to dryness and collecting the water permeating through a reverse osmosis membrane, an effluent water reclamation apparatus comprises a neutralizing device disposed upstream from a reverse osmosis device for neutralizing the effluent water to prevent a scale component from separating out from the effluent water in the process of reverse osmosis, a biological treatment tank for biologically treating the neutralized effluent water, a calcium chloride adding device for adding calcium chloride to the concentrated water resulting from the reverse osmosis, and an adsorption column for removing fluorine ions from the water permeating through the reverse osmosis membrane, the biological treatment tank using a fluidized-bed biological activated carbon process, wherein the biological treatment tank is provided in its interior with a microfiltration membrane for separating an SS component from the treated water, said microfiltration membrane being a flat membrane shaped to hold spacers between membrane portions so that the water to be treated is positioned outside the membrane.

3. An effluent water reclamation apparatus according to claim 2 wherein the acid-alkali effluent water further contains phosphoric acid.

4. In a system for concentrating acid-alkali effluent water containing organic matter by evaporation, evaporating the resulting concentrated water to dryness and collecting the vapor in the form of water, and effluent water reclamation apparatus comprises as arranged upstream from an evaporator a neutralizing device for neutralizing the effluent water to prevent a scale component from separating out from the effluent water in the process of concentration by evaporation, and a biological treatment tank for biologically treating the neutralized effluent water, the biological treatment tank using a fluidized-bed activated carbon process, wherein an SS separator is provided downstream from the biological treatment tank for separating an SS component from the treated water, wherein the SS separator is a centrifugal strainer.

5. In a system for concentrating acid-alkali effluent water containing organic matter and fluorine by evaporation, evaporating the resulting concentrated water to dryness and collecting the vapor in the form of water, an effluent water reclamation apparatus comprises a neutralizing device disposed upstream from an evaporator for neutralizing the effluent water to prevent a scale component from separating out from the effluent water in the process of concentration by evaporation, a biological treatment tank for biologically treating the neutralized effluent water, and a calcium chloride adding device for adding calcium chloride to the concentrated water resulting from the process of concentration by evaporation, the biological treatment tank using a fluidized-bed activated carbon process, wherein an SS separator is provided downstream from the biological treatment tank for separating an SS component from the treated water, wherein the SS separator is a centrifugal strainer.

6. An effluent water reclamation apparatus according to claim 5 wherein the acid-alkali effluent water further contains phosphoric acid.

7. An effluent water reclamation process which uses an apparatus according to any one of claims 1, 2, 3, 5, or 6.

* * * * *